(12) United States Patent
Du et al.

(10) Patent No.: US 7,949,011 B2
(45) Date of Patent: May 24, 2011

(54) METHOD AND APPARATUS FOR CONTROLLING LINK AGGREGATION

(75) Inventors: Jixiong Du, Shenzhen (CN); Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 12/468,578

(22) Filed: May 19, 2009

(65) Prior Publication Data

US 2009/0225777 A1 Sep. 10, 2009

Related U.S. Application Data

(63) Continuation of application No. PCT/CN2007/071327, filed on Dec. 26, 2007.

(30) Foreign Application Priority Data

Dec. 27, 2006 (CN) .......................... 2006 1 0157744

(51) Int. Cl.
*H04J 3/16* (2006.01)
(52) U.S. Cl. ........................................................ 370/468
(58) Field of Classification Search .................. 370/230, 370/252, 431, 468, 477
See application file for complete search history.

(56) References Cited

U.S. PATENT DOCUMENTS

| | | | |
|---|---|---|---|
| 6,956,824 B2 | 10/2005 | Mark et al. | |
| 2002/0141412 A1 | 10/2002 | Wong et al. | |
| 2003/0137937 A1* | 7/2003 | Tsukishima et al. | 370/230 |
| 2005/0135435 A1 | 6/2005 | Ishii | |
| 2006/0215689 A1 | 9/2006 | Liu et al. | |
| 2006/0251074 A1 | 11/2006 | Solomon | |

FOREIGN PATENT DOCUMENTS

| | | |
|---|---|---|
| CA | 2 459 027 C | 4/2006 |
| CN | 1553628 A | 12/2004 |
| CN | 1855890 A | 11/2006 |
| EP | 1 330 084 A1 | 7/2003 |
| GB | 2 423 447 A | 8/2006 |

OTHER PUBLICATIONS

1st Office Action in corresponding Chinese Application No. 200610157744X (Feb. 5, 2010).
Written Opinion of the International Searching Authority in corresponding PCT Application No. PCT/CN2007/071327 (Apr. 10, 2008).

(Continued)

*Primary Examiner* — Derrick W Ferris
*Assistant Examiner* — Mang Yeung
(74) *Attorney, Agent, or Firm* — Leydig, Voit & Mayer, Ltd.

(57) ABSTRACT

A method and apparatus for controlling link aggregation are provided. When a transmission path for transmitting data is established, it is detected whether an available bandwidth of a bearer link at a destination end of the transmission path to be established is sufficient for bearing the data to be transmitted. If not, it is determined whether the destination end has sufficient available aggregatable Ethernet links for bearing the data to be transmitted. If the destination end has sufficient available aggregatable Ethernet links for bearing the data to be transmitted, the destination end is notified to perform a link aggregation sufficient for bearing the data to be transmitted.

15 Claims, 4 Drawing Sheets

OTHER PUBLICATIONS

"G.8080/Y.1304—Architecture for the automatically switched optical network (ASON)," Series G: Transmission Systems And Media, Digital Systems And Networks—Digital Networks—General Aspects, Series Y: Global Information Infrastructure And Internet Protocol Aspects—Internet Protocol Aspects Transport, Nov. 2001, International Telecommunication Union, Geneva, Switzerland.

Rosen et al., "RFC 3031—Multiprotocol Label Switching Architecture," Jan. 2001, The Internet Society, Reston, Virginia.

LAN MAN Standards Committee, "Amendment to Carrier Sense Multiple Access with Collision Detection (CSMA/CD) Access Method and Physical Layer Specifications—Aggregation of Multiple Link Segments," IEEE Standard 802.3ad, 1-173 (2000).

* cited by examiner

METHOD AND APPARATUS FOR CONTROLLING LINK AGGREGATION

CROSS-REFERENCE TO RELATED APPLICATIONS

This application is a continuation of International Patent Application No. PCT/CN2007/071327, filed Dec. 26, 2007, which claims priority to Chinese Patent Application No. 200610157744.X, filed Dec. 27, 2006, both of which are hereby incorporated by reference in their entirety.

FIELD OF THE TECHNOLOGY

The present invention relates to network technologies, and more particularly to a method and apparatus for controlling link aggregation.

BACKGROUND

Currently, Ethernet equipments have an absolute dominant position in access metropolitan area networks (aggregation networks) due to mature technologies and economical products. Ethernet bandwidth becomes larger and larger, and both 100 M Ethernet and 1000 M Ethernet are gradually put into practical applications. However, compared with the bandwidth of a transmission network, the bandwidth of a single Ethernet link is still limited. When data aggregates in a metropolitan area network and enters a transmission network, usually an optical transmission network, such as a generalized multi-protocol label switching (GMPLS) network/automatic switched optical network (ASON), a link aggregation must be performed between an edge equipment of the metropolitan area network and an edge equipment of the transmission network to form an aggregated link, so as to ensure a non-congested and ordered transmission of the data.

With the development of Ethernet technologies, the aggregation of data from an Ethernet metropolitan area network to a transmission network is achieved by aggregating Ethernet links between an edge equipment of the Ethernet network and an edge equipment, such as an MSTP, of a transmission network, such as a GMPLS/AOSN network, or a synchronous digital hierarchy (SDH)/synchronous optical network (SONET)/multi-service transport platform (MSTP) network.

Currently, Ethernet link aggregation is controlled through a link aggregation control protocol (LACP). During network planning, an aggregated link is established between the edge equipment of the Ethernet metropolitan area network and the edge equipment of the transmission network by statically configuring an LACP protocol, links to be aggregated are statically designated on the edge equipments, and the designated Ethernet links are aggregated into a single data channel with a larger bandwidth. After a link aggregation is configured on Ethernet equipments, an LACP data unit periodically exchanges port information corresponding to links to be aggregated between the Ethernet equipments. LACP will notify the Ethernet equipments to take a port configured during the aggregation as an adapter for aggregated links.

The conventional art is introduced below with reference to a network structure shown in FIG. 1. As shown in FIG. 1, data from a metropolitan area network aggregates at edge nodes E1 and E2 of an Ethernet metropolitan area network, and is then transmitted through a transmission network by edge nodes C1 and C2 of the transmission network. It is assumed that Ethernet links have a maximum bandwidth of 1 Gbit/s, transmission network links have a maximum bandwidth of 10 Gbit/s, and a bandwidth of 4 Gbit/s is required by data transmitted between E1 and E2. In order to ensure a non-congested and ordered transmission of the data from the edge nodes of the Ethernet metropolitan area network to the edge nodes of the transmission network, a single transmission channel with a larger bandwidth needs to be provided between the edge nodes of the Ethernet network and the edge nodes of the transmission network through Ethernet link aggregation. Thus, in FIG. 1, it needs to statically designate on C1 and C2 that at least four Ethernet physical links with a bandwidth of 1 Gbit/s between E1 and C1 are aggregated into a logical data channel link with a bandwidth of 4 Gbit/s, and at least four Ethernet links with a bandwidth of 1 Gbit/s between E2 and C2 are aggregated into a link with a bandwidth of 4 Gbit/s.

However, the inventors has found through further study that the above conventional art is in nature a static planning and configuration method, and as dynamic data transmission is more popular nowadays, the above conventional art can hardly meet the requirements of dynamic data transmission. Moreover, a data congestion problem caused by inconsistency in data-bearing bandwidth also cannot be solved.

SUMMARY

Accordingly, embodiments of the present invention provide a method and apparatus for controlling link aggregation so as to control a link aggregation dynamically.

The embodiments of the present invention provide a method for controlling link aggregation. The method includes: whether an available bandwidth of a bearer link at a destination end of a transmission path is sufficient for bearing data to be transmitted is detected; whether the destination end has sufficient available aggregatable Ethernet links for bearing data to be transmitted is judged, if the available bandwidth of the bearer link at the destination end is insufficient for bearing the data to be transmitted; and notifying the destination end to perform a link aggregation sufficient for bearing the data to be transmitted, if the destination end has sufficient available aggregatable Ethernet links for bearing the data to be transmitted.

The embodiments of the present invention further provide an apparatus for controlling link aggregation. The apparatus includes: (1) a detection module, adapted to detect whether an available bandwidth of a bearer link at a destination end of a transmission path is sufficient for bearing data to be transmitted; (2) a judging module, adapted to receive a detection result of the detection module and judge whether the destination end has sufficient available aggregatable Ethernet links for bearing a data to be transmitted, if the detection result is that the available bandwidth of the bearer link at the destination end is insufficient for bearing the data to be transmitted; and (3) a link aggregation module, adapted to receive a judging result of the judging module and notify the destination end to perform a link aggregation sufficient for bearing the data to be transmitted, if the judging result is that the destination end has sufficient available aggregatable Ethernet links for bearing the data to be transmitted.

Applying the embodiments of the present invention, firstly, whether the available bandwidth of the bearer link at the destination end is sufficient for bearing the data to be transmitted is judged; and whether the destination end has sufficient available aggregatable Ethernet links for bearing the data to be transmitted is judged, if the available bandwidth of the bearer link at the destination end is insufficient for bearing the data to be transmitted; a link aggregation sufficient for bearing the data to be transmitted is performed at the destination end, if the destination end has sufficient available aggregatable Ethernet links for bearing the data to be transmitted. Thus, a dynamic control over the link aggregation is realized, which may meet the requirements of dynamic data transmission. Meanwhile, the data congestion problem caused by inconsistency in data-bearing bandwidth is also solved.

DETAILED DESCRIPTION

Figure 1:
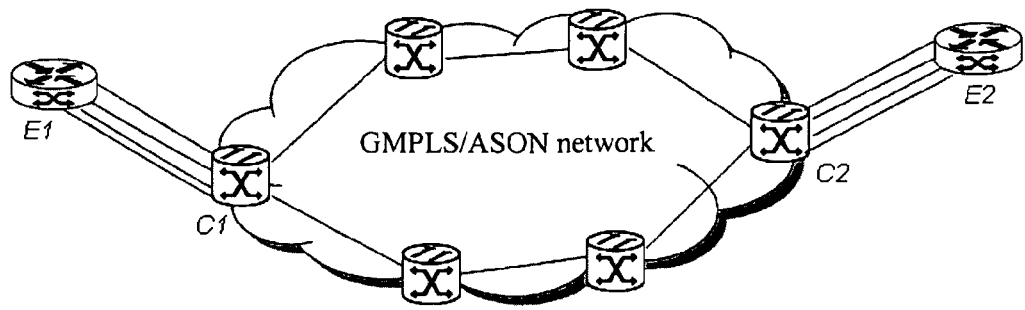
FIG. 1 is a schematic view of a network structure applied in an embodiment of the present invention.

Referring to FIG. 1, E1 and E2 are edge nodes of an aggregation network (for example, an Ethernet metropolitan area network), and C1 and C2 are edge nodes of a switching network (i.e., a transmission network). In practice, it is assumed that four Ethernet links with a bandwidth of 1 Gbit/s has been aggregated between the nodes E1 and C1 to provide a bandwidth of 4 Gbit/s, and only three Ethernet links with a bandwidth of 1 Gbit/s has been aggregated between the nodes C2 and E2 to provide a bandwidth of 3 Gbit/s.

Obviously, in the conventional art, when a connection is established between E1 and E2 to transmit data at 4 Gbit/s, data congestion occurs at the node C2. As the conventional art is in nature a static planning and configuration method, it cannot provide link aggregation control capability in dynamic data in view of the dynamic bandwidth requirements caused by dynamic data transmission, and thus cannot solve the traffic congestion problem by maintaining the consistency in data-bearing bandwidth.

The conventional art may also cause the Ethernet link aggregation capability between the edge nodes of the local transmission network and the edge nodes of the aggregation network to be inconsistent with that at the remote end, thereby end-to-end data connection with a guaranteed bandwidth cannot be established. For example, for the network structure shown in FIG. 1, if two Ethernet links with a bandwidth of 1 Gbit/s can be aggregated between the nodes E1 and C1 at this time, and no independent Ethernet link can be aggregated between the corresponding nodes C2 and E2, when it attempts to establish a data connection with a reserved bandwidth of 2 Gbit/s from the node E1 to the node E2, signaling processing on the node C2 may fail because sufficient bandwidth cannot be reserved. The signaling failure may waste valuable network resources and system resources, and may also waste the bandwidth to some extent. The fundamental reason lies in that an ingress node of the connection cannot know the aggregation capability of the edge nodes when performing traffic-engineering and routing selection, and thus cannot perform corresponding processing.

It should be noted that, both a source end and a destination end of the data transmission path in FIG. 1 are edge nodes of the transmission network, and aggregated links are links between the edge nodes of the transmission network and the edge nodes of the aggregation network. However, in fact, the above problem also occurs when one or both of the source end and the destination end are internal nodes of the switching network rather than the edge nodes.

The present invention is described in further detail below through embodiments and the accompanying drawings. For ease of description, in the embodiments, both the source end and the destination end of the data transmission path are edge nodes of the transmission network, and the aggregated links are links between the edge nodes of the transmission network and the edge nodes of the aggregation network. However, in fact, the embodiments of the present invention may also be applied within the transmission network to provide a dynamic Ethernet link aggregation function of an Ethernet link. For example, when two nodes across one or more intermediate nodes on the transmission path use an Ethernet link as a data link and the data link supports the Ethernet link aggregation function, a service passing through the two nodes can be transmitted along a non-congested path by applying embodiments of the present invention. As the processing manner is substantially similar to the following embodiments and those of ordinary skill in the art can easily deduce other implementations according to this embodiment, the details are not described herein again. Moreover, it should be noted that, in addition to the link aggregation in the transmission network mentioned in the embodiments of the present invention, in other implementations, the transmission network may also be replaced by other networks such as an access network, a congestion network, and so on, so as to configure the bandwidth of Ethernet aggregated links thereof dynamically. As the implementation method is almost the same as the embodiments of the present invention, these situations are not additionally described in the following embodiments for conciseness of description.

Figure 2:
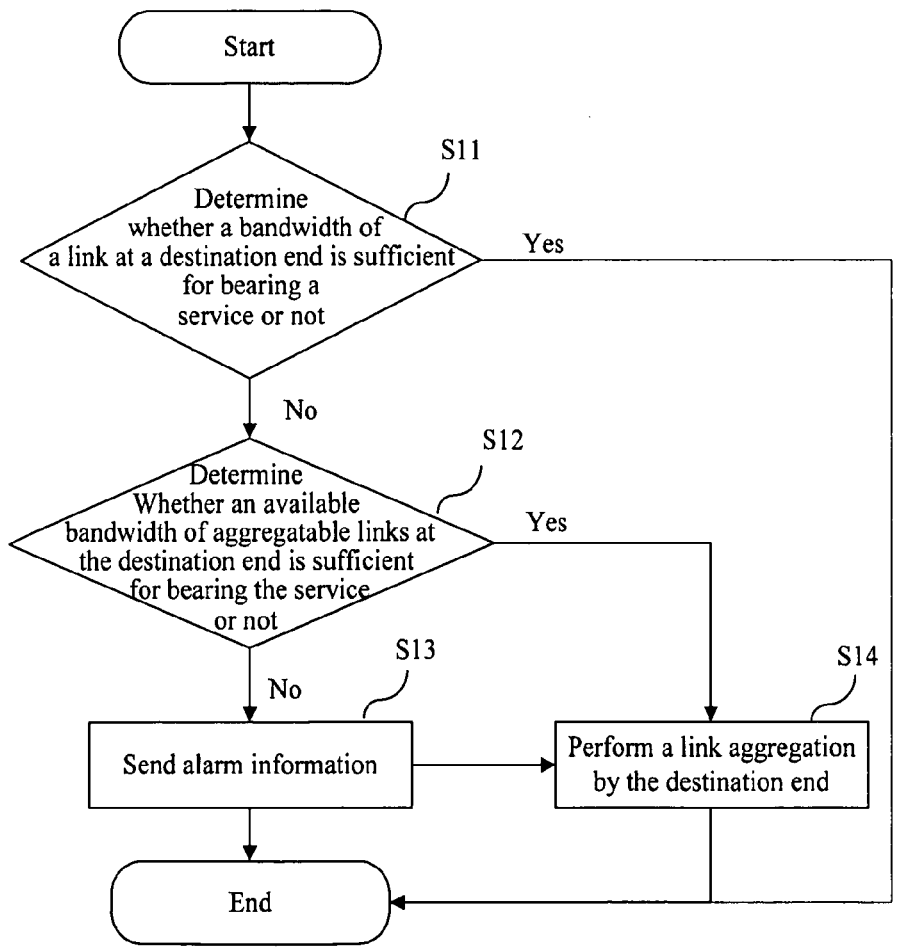
FIG. 2 is a schematic view of a method for controlling link aggregation according to an embodiment of the present invention.

By applying a method for controlling link aggregation provided in an embodiment of the present invention, Ethernet links between an edge equipment of an access network and an edge equipment of a transmission network (such as a GMPLS/AOSN network or a SDH/SONET/MSTP network), or Ethernet links between internal equipments of the transmission network may be aggregated according to data transmission requirements. A network structure applied in this embodiment is as shown in FIG. 1. Referring to FIG. 2, a method for controlling link aggregation provided in an embodiment of the present invention includes the following steps.

In Step S11, when a data needs to be transmitted in a transmission network and a transmission path needs to be established, an Ethernet bearer link between a destination end (i.e., an egress node) C2 of the transmission path to be established and an edge node E2 of an aggregation network (which is an Ethernet metropolitan area network in this embodiment) is detected to judge whether a bandwidth thereof is sufficient for bearing the data to be transmitted. If the available bandwidth of the bearer link (the bearer link at the destination end may be a single link, and may also be an aggregated link) between the destination end C2 and E2 is sufficient for bearing the data, the flow ends. Otherwise, the process proceeds to Step S12. In this embodiment, the judging manner specifically is whether the bandwidth of the bearer link at the destination end is smaller than that required by the data to be transmitted is judged, and it indicates that the available bandwidth of the bearer link at the destination end is insufficient for bearing the data to be transmitted if the bandwidth of the bearer link at the destination end is smaller than that required by the data to be transmitted. In other words, Step S11 is mainly used to judge whether an available bandwidth of a logical link at the destination end is sufficient for bearing the data to be transmitted.

In Step S12, an available bandwidth of aggregatable Ethernet links at the destination end C2 is judged, so as to judge whether the destination end C2 has a sufficient available bandwidth for bearing the data to be transmitted. In this embodiment, the judging method is specifically as follows: when the system is initialized and the links change, the destination end floods information about a maximum physical bandwidth, a reserved bandwidth and a reservable bandwidth thereof, and a source end judges, according to the received maximum physical bandwidth and reservable bandwidth of the destination bandwidth, whether a total bandwidth of available aggregatable links at the destination end is not smaller than the bandwidth of the data to be transmitted. The process proceeds to Step S14 if the total bandwidth of available aggregatable links at the destination end is not smaller than the bandwidth of the data to be transmitted. Otherwise, The process proceeds to Step S13. In other words, Step S12 is mainly used to judge whether a plurality of aggregatable links at the destination end is sufficient for bearing the data to be transmitted once being aggregated together.

In Step S13, alarm information is sent according to a pre-configured alarm policy to prompt that the destination end C2 cannot provide a sufficient bandwidth and thus the transmission path cannot be normally established.

In Step S14, the destination end is notified to perform a link aggregation, the destination end establishes an aggregated link between the destination end C2 and the edge node E2 of the aggregation network after receiving notification information, and a bandwidth of the aggregated link is not smaller than that required by the data to be transmitted.

In Step S13 of this embodiment, the configured policy is sending alarm information when the available bandwidth of the aggregatable Ethernet links at the destination end C2 is insufficient for bearing the data. In other embodiments, other policies may also be adopted, for example, rerouting or re-segmenting data, for adjusting and maintaining the bandwidth of links of the transmission path and the local path to be consistent with the available bandwidth of the aggregated Ethernet links at the destination end.

In addition, in other embodiments, if the judging result of Step S12 indicates that the total bandwidth of available aggregatable links at the destination end is smaller than the bandwidth of the data to be transmitted and a link for transmitting the data to be transmitted between the source end C1 of the transmission path to be established and the edge node E1 of the Ethernet metropolitan area network is an aggregated link, Step S13 may also be: the number of Ethernet links aggregated in the aggregated link at the source end is reduced. Thus unnecessary bandwidth waste at the source end can be avoided. In such an implementation, C1 may send a notification message to E1, and E1 reduces the bandwidth of the data to be transmitted after receiving the notification message. Moreover, the alarm process may also be combined with the process of reducing the number of Ethernet links aggregated in the aggregated link at the source end. Meanwhile, there may be many methods for judging the available bandwidth at the destination end in Step S12. For example, a request is sent to the destination end, and the destination end directly returns the available bandwidth thereof.

The method for controlling link aggregation of the present invention and some exemplary applications of the method for establishing a label switched path (LSP) are described below in further detail through exemplary embodiments.

A First Exemplary Embodiment

Figure 3:
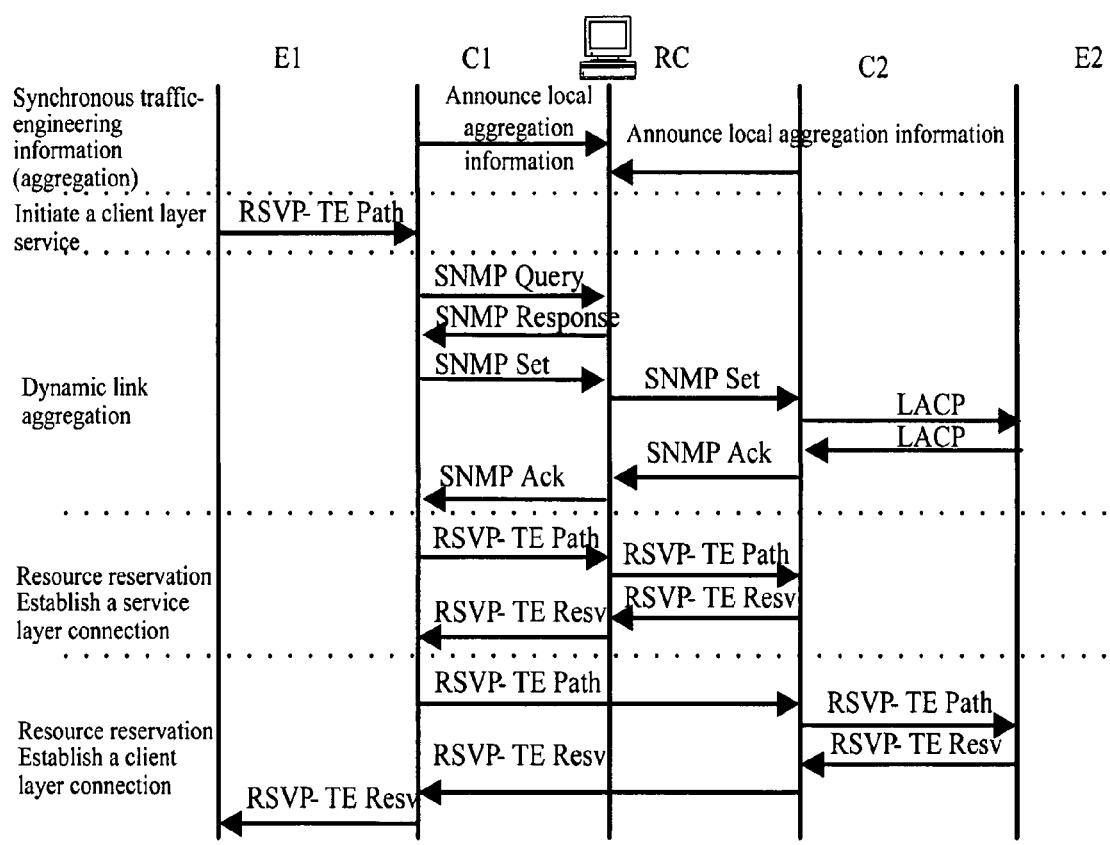
FIG. 3 is a schematic timing diagram of a first embodiment applying the method for controlling link aggregation of the present invention.

FIG. 3 is a schematic timing diagram of a first exemplary embodiment of the present invention, and the network structure of this embodiment is same to that shown in FIG. 1: edge equipments E1 and E2 of an Ethernet metropolitan area network are respectively connected to edge equipments C1 and C2 of an ASON network via a plurality of Ethernet links. Data from E1 to E2 firstly arrives and aggregates at E1, and is then transmitted to the edge node C1 of the ASON network via directly connected Ethernet links. In the ASON network, the data is transmitted to the edge node C2 along an established path with connections. C1 is directly connected to C2, or at least one intermediate node P of the ASON network exists between C1 and C2. Then, the data is transmitted to the edge equipment E2 of the Ethernet metropolitan area network via the Ethernet links between C2 and E2.

In this embodiment, the nodes in the transmission network may announce information through flooding when the system is initialized and the links (including aggregated logical links) change. In such a manner, the edge nodes C1 and C2 obtain related information of each other and store the information to form a traffic-engineering database, thus know information related to bandwidth resources of each other, for example, information about whether the bandwidth resources can be aggregated together, or information about the effect after aggregation. Some of the attribute information is the original traffic-engineering information, and the other is extended information. In this embodiment, the information is collectively referred to as traffic-engineering information including, for example, a maximum physical bandwidth, a reserved bandwidth, a reservable bandwidth, maximum transmission unit (MTU), whether an operating mode is simplex or duplex, virtual local area network (VLAN) ID, whether an LACP is supported and enabled, and whether an operating mode of the LACP is automatic configuration or manual configuration. The information may be, for example, announced on basis of the existing traffic-engineering information.

In order to transmit the data from E1 to E2, the Ethernet metropolitan area network needs to establish a GMPLS LSP from C1 to C2 across the ASON network, which is marked with LSP-1 herein.

Firstly, E1 sends a signaling carrying a bandwidth reservation request to the edge node C1 of the ASON network. In this embodiment, the signaling is a resource reservation protocol (RSVP)-TE Path signaling adapted to trigger C1 to initiate a signaling for establishing another GMPLS LSP (which is marked with LSP-2 herein). The LSP-2 is adapted to provide a transmission service for the establishment of LSP-1. The RSVP-TE Path signaling sent by C1 is processed hop by hop in the selected path and finally arrives at the edge node C2. Afterward, C2 checks the reservable link bandwidth between C2 and E2 based on the bandwidth reservation request in the signaling and the traffic-engineering database. If the reservable link bandwidth between C2 and E2 meets the service requirements, C2 reserves a bandwidth in a direction opposite to that in which C1 sends the RSVP-TE Path signaling through a RSVP-TE Resv signaling and assigns a label, so as to directly establish LSP-2. If the reservable bandwidth of the Ethernet links between C2 and E2 is insufficient for bearing the data to be transmitted, but the required reservable bandwidth can be obtained by aggregating the Ethernet links between C2 and E2, C2 is notified to perform a link aggregation, and then C2 aggregates the Ethernet links between C2 and E2 through an LACP protocol, so that the aggregated bandwidth between C2 and E2 meets the data transmission requirements.

If the link aggregation succeeds through an embodiment of the present invention, C2 reserves a bandwidth within the ASON network in a direction opposite to the path from C1 through an RSVP-TE Resv signaling and assigns a label, so as to establish LSP-2. If the aggregation fails or the required reservable bandwidth cannot be provided between C2 and E2 even through aggregation, processing is performed according to a pre-configured policy, for example, issuing an alarm to a network manager.

After the LSP-2 is successfully established, C1 transparently transmits the RSVP-TE Path signaling coming from E1 to C2 via LSP-2 for establishing the LSP-1. C2 locally processes the RSVP-TE Path signaling and then transmits the RSVP-TE Path signaling to E2. After processing the RSVP-TE Path signaling, E2 reserves a bandwidth in a direction opposite to the path from E1 and assigns a label, so as to establish the LSP-1. After the LSP-1 is successfully established, data can be normally transmitted between E1 and E2.

A Second Exemplary Embodiment

Figure 4:
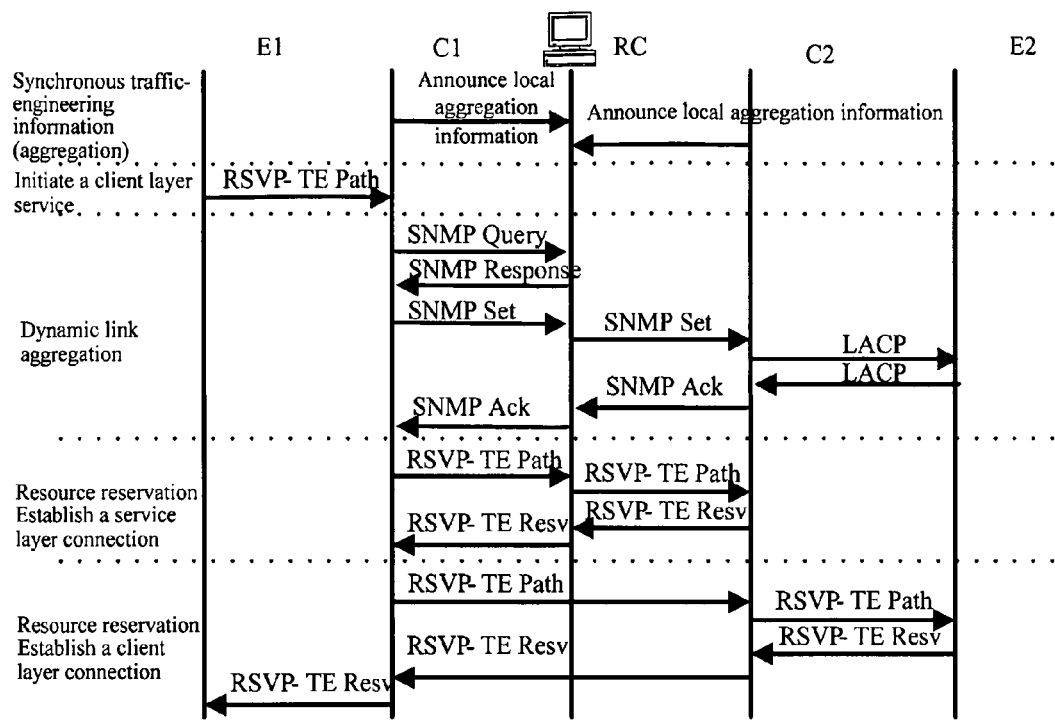
FIG. 4 is a schematic timing diagram of a second embodiment applying the method for controlling link aggregation of the present invention.

FIG. 4 is a schematic timing diagram of a second exemplary embodiment of the present invention, and the network structure of this embodiment is same to that shown in FIG. 1: edge equipments E1 and E2 of an Ethernet metropolitan area network are respectively directly connected to edge equipments C1 and C2 of an ASON network controlled by GMPLS via a plurality of Ethernet links. Data that needs to be transmitted to E2 via E1 firstly arrives and aggregates at E1, and is then transmitted to the edge node C1 of the ASON network via directly connected Ethernet links. In the ASON network, the data is transmitted to the edge node C2 along a path with connections. C1 is directly connected to C2, or at least one intermediate node of the ASON network exists between C1 and C2. Finally, the data is transmitted to the edge equipment E2 of the Ethernet metropolitan area network via directly connected Ethernet links.

The method of this embodiment is similar to that in the first embodiment. The nodes in the transmission network may announce information through flooding when the system is initialized and the links (including aggregated logical links) change. In such a manner, the edge nodes C1 and C2 obtain related information of each other and store the information to form a traffic-engineering database, thus know information about whether bandwidth resources thereof can be aggregated together, and information about the effect after aggregation, etc. In this embodiment, the attribute information includes, for example, maximum physical bandwidth, reserved bandwidth, reservable bandwidth, MTU, whether an operating mode is simplex or duplex, VLAN ID, whether an LACP is supported and enabled, and whether an operating mode of the LACP is automatic configuration or manual configuration. The information may be, for example, announced on the basis of the existing traffic-engineering information.

In this embodiment, in order to transmit data between E1 and E2, a GMPLS LSP from C1 to C2 needs to be established so as to transmit the data between C1 and C2. This GMPLS LSP is marked with LSP-1 for being distinguished from others. Firstly, E1 sends a signaling carrying bandwidth reservation requirement information to the edge node C1 of the ASON network. In this embodiment, the signaling is an RSVP-TE Path signaling. C1 checks the reservable bandwidth between C2 and E2 based on the bandwidth reservation requirement in the signaling and a synchronous traffic-engineering database. If the reservable bandwidth is sufficient for bearing the data to be transmitted, an LSP-2 path is directly established between C1 and C2. The method for establishing LSP-2 is same to the conventional art. If the reservable bandwidth is insufficient for bearing the data, but the required reservable bandwidth can be obtained by aggregating the Ethernet links between C2 and E2, C1 sends a direct message cross a plurality of nodes to notify C2. In this embodiment, the message is, for example, an RSVP-TE Notify message. On receiving the message, C2 aggregates the Ethernet links between C2 and E2 through an LACP protocol, so as to meet the requirement of the data to be transmitted.

If the link aggregation between C2 and E2 succeeds through the method for controlling link aggregation of the present invention, C1 initiates a request for establishing LSP-2. The RSVP-TE Path signaling sent by C1 is processed hop by hop in the selected path and finally arrives at the edge node C2. C2 reserves a bandwidth within the ASON network in a direction opposite to the path from C1 through an RSVP-TE Resv signaling and assigns a label, so as to establish the LSP-2. If the aggregation fails, or the required reservable bandwidth cannot be provided between C2 and E2 even through aggregation, processing is performed according to a pre-configured policy, for example, issuing an alarm to a network manager.

After LSP-2 is successfully established, E1 sends the RSVP-TE Path signaling via LSP-2. C1 transparently transmits the signaling to C2. C2 locally processes the signaling, and then transmits the signaling to E2. After processing the signaling, E2 reserves a bandwidth in a direction opposite to the path from E1 and assigns a label, so as to establish the LSP-1.

A Third Exemplary Embodiment

Figure 5:
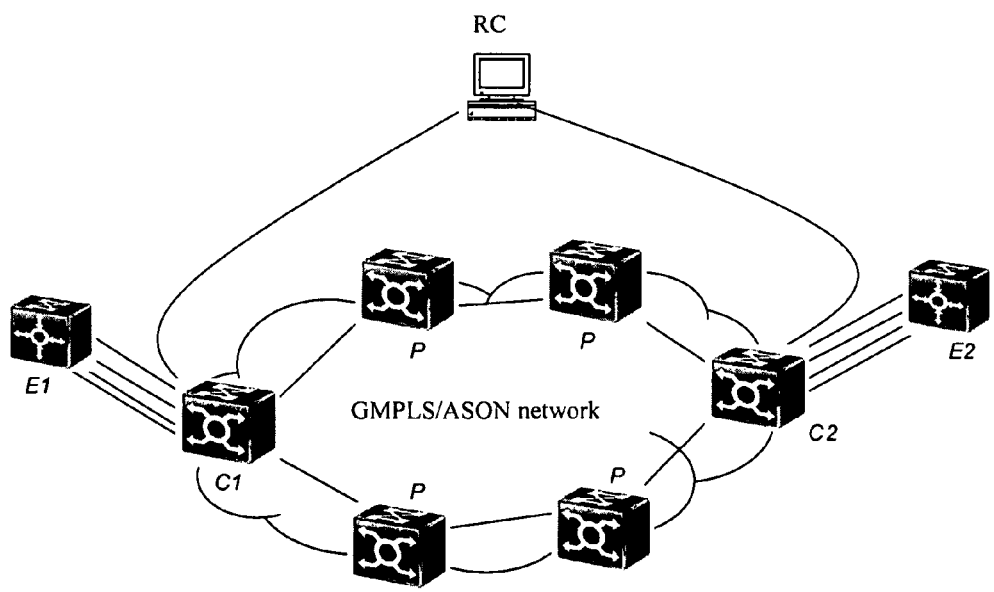
FIG. 5 is a schematic view of a network structure of an embodiment applying the method for controlling link aggregation of the present invention.
Figure 6:
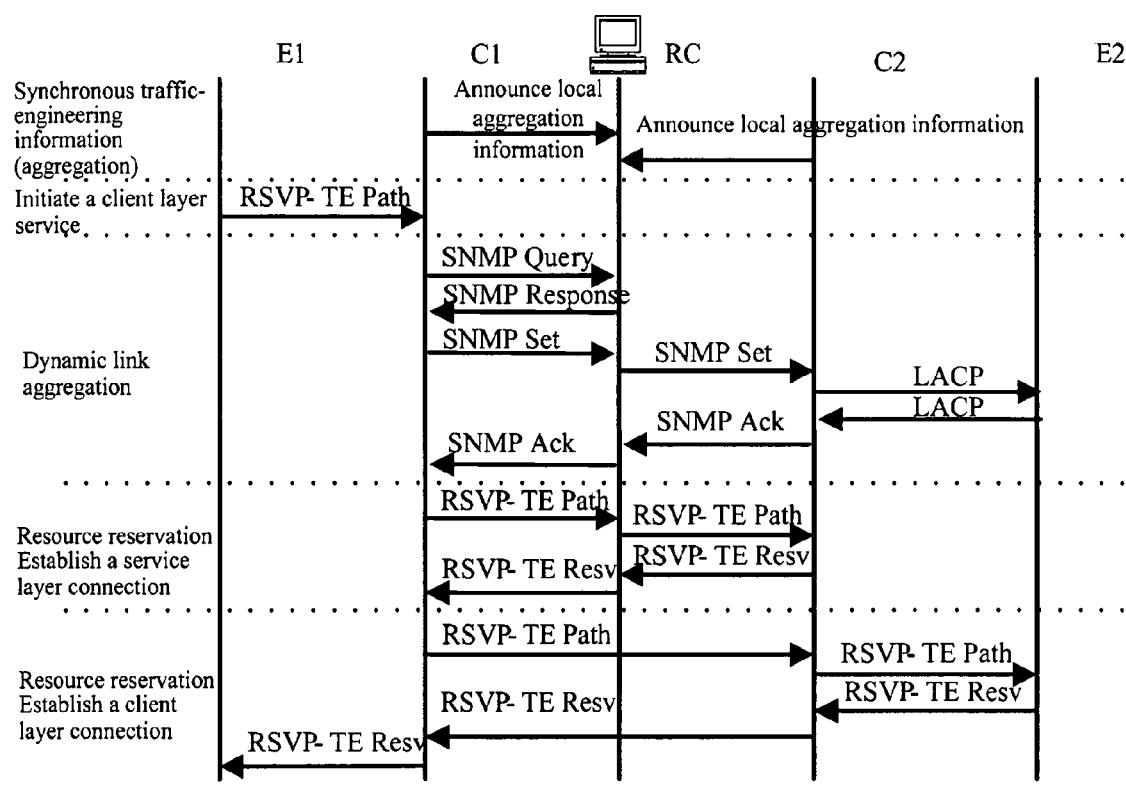
FIG. 6 is a schematic timing diagram of a third embodiment applying the method for controlling link aggregation of the present invention.

FIG. 6 is a schematic timing diagram of a third exemplary embodiment of the present invention. The network structure applied in this embodiment is approximately the same as that in the first embodiment and the second embodiment, and the difference lies in that a resource controller (RC) is additionally provided in this embodiment. The applied network structure is as shown in FIG. 5: edge equipments E1 and E2 of an Ethernet metropolitan area network are respectively directly connected to edge equipments C1 and C2 of an ASON network controlled by GMPLS via a plurality of Ethernet links. Data from E1 to E2 firstly arrives and aggregates at E1, and is then transmitted to the edge node C1 of the ASON network via directly connected Ethernet links. In the ASON network, the data is transmitted to the edge node C2 along a path with connections, and one or more intermediate nodes P may exist between C1 and C2. Then, the data is transmitted to the edge equipment E2 of the Ethernet metropolitan area network via directly connected Ethernet links. Both C1 and C2 are connected to the RC.

In this embodiment, C1 and C2 may announce attribute information of an Ethernet link aggregation to the RC when the system is initialized and the links (including aggregated logical links) change. In this embodiment, the attribute information includes, for example, maximum physical bandwidth, reserved bandwidth, reservable bandwidth, MTU, whether an operating mode is simplex or duplex, VLAN ID, whether an LACP is supported and enabled, and whether an operating mode of the LACP is automatic configuration or manual configuration. The information may be, for example, announced on the basis of the existing traffic-engineering information, and stored by the RC to form a traffic-engineering database.

In this embodiment, the Ethernet metropolitan area network establishes a GMPLS LSP (which is marked as LSP-1 herein) from C1 to C2 that are across the ASON network. Firstly, E1 sends a signaling carrying bandwidth reservation requirement to the edge node C1 of the ASON network. In this embodiment, the signaling is an RSVP-TE Path signaling. C1 sends a query request to the RC through a simple network management protocol (SNMP). The RC queries whether the reservable bandwidth between C2 and E2 in a designated path is sufficient for bearing the data to be transmitted based on the bandwidth reservation requirement and the traffic-engineering database. If the reservable bandwidth is insufficient for bearing the data to be transmitted, but the required reservable bandwidth can be provided by aggregating the Ethernet links between C2 and E2, C1 notifies C2 via the RC. C2 aggregates the Ethernet links between C2 and E2 through an LACP protocol, so as to meet the requirement of the data to be transmitted between E1 and E2.

If the link aggregation between C2 and E2 succeeds through the method for controlling link aggregation of the present invention, C1 initiates a request for establishing LSP-2. The RSVP-TE Path signaling sent by C1 is processed hop by hop in the selected path and finally arrives at the edge node C2. C2 reserves a bandwidth within the ASON network in a direction opposite to the path from C1 through an RSVP-TE Resv signaling and assigns a label, so as to establish LSP-2. If the aggregation fails or the required reservable bandwidth cannot be provided between C2 and E2 even through aggregation, an exception processing is performed according to a pre-configured policy, for example, issuing an alarm to a network manager.

After LSP-2 is successfully established, E1 sends the RSVP-TE Path signaling via LSP-2. C1 transparently transmits the signaling to C2. C2 locally processes the signaling and then transmits the signaling to E2. After processing the signaling, E2 reserves a bandwidth in a direction opposite to the path from E1 and assigns a label, so as to establish LSP-1.

Those of ordinary skill in the art should understand that all or part of the steps in the method according to the embodiments of the present invention can be implemented by a program instructing relevant hardware, and the program may be stored in a computer readable storage media, such as a ROM/RAM, a magnetic disk, or an optical disk.

The present invention further provides an apparatus for controlling link aggregation, which is adapted to perform an Ethernet link aggregation to establish a transmission path for data transmission. The apparatus includes a detection module, a judging module and a link aggregation module. The apparatus may be an independent system (for example, the RC in the above embodiment), and may also be integrated at a source end of the transmission path to be established.

The detection module is adapted to detect whether an available bandwidth of a bearer link at a destination end of the transmission path is sufficient for bearing service data to be transmitted. The judging module is adapted to receive a detection result of the detection module, and determine whether the destination end has sufficient available aggregatable Ethernet links, if the detection result is that the bearer link at the destination end is insufficient for bearing the service data to be transmitted. The link aggregation module is adapted to receive a judging result of the determination module and notify the destination end to perform a link aggregation, if the determination result of the determination module is that the destination end has sufficient available aggregatable Ethernet links.

In addition, the apparatus may further include a link reduction module, which is adapted to reduce the number of Ethernet links aggregated in a bearer link at the source end of the transmission path to be established, if the judging result of the judging module is that the destination end does not have sufficient available aggregatable Ethernet links and the bearer link at the source end is an aggregated link.

Moreover, the apparatus may further include an alarm module, which is adapted to send alarm information to notify an abnormal condition if the judging result of the judging module is that the destination end does not have sufficient available aggregatable Ethernet links.

Furthermore, the apparatus may further include an aggregation information announcement module, which is adapted to announce aggregation information of the destination end to the detection module, so that the detection module detects a bandwidth of the service destination end according to the aggregation information. Certainly, the aggregation information announcement module may also send the aggregation information to the determination module, so that the judging module judges whether the destination end has sufficient available aggregatable Ethernet links for bearing the data to be transmitted according to the aggregation information.

The above descriptions are merely exemplary implementations of the present invention. It should be noted that those of ordinary skill in the art can make improvements and modifications without departing from the principle of the present invention, for example, applying the present invention to other networks other than the switching network, or to non-ASON networks such as data networks. An LSP established in the data networks is a multi-protocol label switched (MPLS) path. One or two of the source end and the destination end may also be non-edge nodes. Such improvements and modifications should be construed as falling within the scope of the present invention.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:
1. A method for controlling link aggregation, comprising:
  detecting whether an available bandwidth of a first bearer link at a destination end of a transmission path is sufficient for bearing data to be transmitted, wherein the transmission path comprising at least one intermediate node locating between a source end and the destination end;
  judging whether the destination end has sufficient available aggregatable Ethernet links for bearing the data to be transmitted if the available bandwidth of the first bearer link at the destination end is insufficient for bearing the data to be transmitted;
  notifying the destination end to perform a link aggregation sufficient for the first bear link at the destination end to bear the data to be transmitted if the destination end has sufficient available aggregatable Ethernet links for bearing the data to be transmitted; and
  reducing a number of Ethernet links aggregated in a second bear link at the source end of the transmission path if the destination end does not have sufficient available aggregatable Ethernet links for bearing the data to be trans- mitted on the first bear link, wherein the second bearer link at the source end node of the transmission path is an aggregated link.

2. The method for controlling link aggregation according to claim 1, wherein the judging whether the destination end has sufficient available aggregatable Ethernet links for bearing the data to be transmitted comprises: judging, by the source end of the transmission path, whether the destination end has sufficient available aggregatable Ethernet links for bearing the data to be transmitted, according to destination-end aggregation information flooded by the destination end.

3. The method for controlling link aggregation according to claim 1, wherein the judging whether the destination end has sufficient available aggregatable Ethernet links for bearing the data to be transmitted comprises: judging, by a resource controller (RC), whether the destination end has sufficient available aggregatable Ethernet links for bearing the data to be transmitted, according to destination-end aggregation information sent by the destination end.

4. The method for controlling link aggregation according to claim 1, wherein a source end of the transmission path sends out alarm information if the destination end does not have sufficient available aggregatable Ethernet links for bearing the data to be transmitted.

5. The method for controlling link aggregation according to claim 4, wherein the judging whether the destination end has sufficient available aggregatable Ethernet links for bearing the data to be transmitted comprises:
  judging, by the source end of the transmission path, whether the destination end has sufficient available aggregatable Ethernet links for bearing the data to be transmitted, according to destination-end aggregation information flooded by the destination end.

6. The method for controlling link aggregation according to claim 4, wherein the judging whether the destination end has sufficient available aggregatable Ethernet links for bearing the data to be transmitted comprises:
  judging, by a resource controller (RC), whether the destination end has sufficient available aggregatable Ethernet links for bearing the data to be transmitted, according to destination-end aggregation information sent by the destination end.

7. The method for controlling link aggregation according to claim 1, wherein the judging whether the destination end has sufficient available aggregatable Ethernet links for bearing the data to be transmitted comprises:
  judging, by the source end of the transmission path, whether the destination end has sufficient available aggregatable Ethernet links for bearing the data to be transmitted, according to destination-end aggregation information flooded by the destination end.

8. The method for controlling link aggregation according to claim 1, wherein the judging whether the destination end has sufficient available aggregatable Ethernet links for bearing the data to be transmitted comprises:
  judging, by a resource controller (RC), whether the destination end has sufficient available aggregatable Ethernet links for bearing the data to be transmitted, according to destination-end aggregation information sent by the destination end.

9. An apparatus for controlling link aggregation, comprising:
  a detection device for detecting whether an available bandwidth of a first bearer link at a destination end of a transmission path is sufficient for bearing data to be transmitted, wherein the transmission path comprising at least one intermediate node locating between a source end and the destination end;
  a judging device for receiving a detection result of the detection module and judge whether the destination end has sufficient available aggregatable Ethernet links for bearing the data to be transmitted, if the detection result is that the available bandwidth of the first bearer link at the destination end is insufficient for bearing the data to be transmitted;
  a link aggregation device for receiving a judging result of the judging module and notify the destination end to perform a link aggregation sufficient for the first bear link at the destination end to bear the data to be transmitted if the judging result is that the destination end has sufficient available aggregatable Ethernet links for bearing the data to be transmitted; and
  a link reduction device for reducing a number of Ethernet links aggregated in a second bear link at the source end of the transmission path if the destination end does not have sufficient available aggregatable Ethernet links for bearing the data to be transmitted on the first bear link, wherein the second bearer link at the source end node of the transmission path is an aggregated link.

10. The apparatus for controlling link aggregation according to claim 9, wherein the apparatus is integrated at the source end of the transmission path.

11. The apparatus for controlling link aggregation according to claim 9, further comprising:
  an alarm module for sending out alarm information if the judging result of the judging module is that the destination end does not have sufficient available aggregatable Ethernet links for bearing the data to be transmitted.

12. The apparatus for controlling link aggregation according to claim 11, wherein the apparatus is integrated at the source end of the transmission path.

13. The apparatus for controlling link aggregation according to claim 9, further comprising: an aggregation information announcement module for announcing aggregation information of the destination end to the detection module, wherein the detection module detects whether the available bandwidth of the bearer link at the destination end is sufficient for bearing the data to be transmitted according to the aggregation information.

14. The apparatus for controlling link aggregation according to claim 13, wherein the apparatus is integrated at the source end of the transmission path.

15. The apparatus for controlling link aggregation according to claim 9, wherein the apparatus is integrated at the source end of the transmission path.

* * * * *

UNITED STATES PATENT AND TRADEMARK OFFICE
CERTIFICATE OF CORRECTION

| | | |
|---|---|---|
| PATENT NO. | : 7,949,011 B2 | Page 1 of 1 |
| APPLICATION NO. | : 12/468578 | |
| DATED | : May 24, 2011 | |
| INVENTOR(S) | : Dong et al. | |

It is certified that error appears in the above-identified patent and that said Letters Patent is hereby corrected as shown below:

In section (12) of the Title page, line 2, replace "Du et al." with -- Dong et al. --.

In section (75) of the Title page titled "Inventors," line 1, replace "Jixiong Du" with -- Jixiong Dong --.

Signed and Sealed this
Fifth Day of July, 2011

David J. Kappos
*Director of the United States Patent and Trademark Office*